US011987072B2

(12) United States Patent
Zimmerman et al.

(10) Patent No.: US 11,987,072 B2
(45) Date of Patent: May 21, 2024

(54) THREE DIMENSIONAL SHADOW BOX WITH WATER FLOW

(71) Applicant: Outside The Lines, Inc., Anaheim, CA (US)

(72) Inventors: J. Wickham Zimmerman, Huntington Beach, CA (US); Christopher J. Roy, Brea, CA (US); Thomas M. Real, Mission Viejo, CA (US); Allison N. Long, Newport Beach, CA (US)

(73) Assignee: Outside The Lines, Inc., Anaheim, CA (US)

( * ) Notice: Subject to any disclaimer, the term of this patent is extended or adjusted under 35 U.S.C. 154(b) by 489 days.

(21) Appl. No.: 17/378,563

(22) Filed: Jul. 16, 2021

(65) Prior Publication Data

US 2022/0023907 A1 Jan. 27, 2022

Related U.S. Application Data

(60) Provisional application No. 63/055,694, filed on Jul. 23, 2020.

(51) Int. Cl.
*B44F 1/06* (2006.01)
*B44F 1/14* (2006.01)

(52) U.S. Cl.
CPC ................ *B44F 1/066* (2013.01); *B44F 1/14* (2013.01)

(58) Field of Classification Search
CPC .......... B44F 1/066; B44F 1/14; A47G 1/0616; A47G 1/0622; G09F 19/12; B05B 17/085
USPC .................................................... 40/743, 800
See application file for complete search history.

(56) References Cited

U.S. PATENT DOCUMENTS

| | | | | | |
|---|---|---|---|---|---|
| 1,244,959 | A * | 10/1917 | Conover | G09F 13/0495 | 40/577 |
| 1,777,944 | A * | 10/1930 | Trovato | G09F 23/00 | 40/725 |
| 2,565,553 | A * | 8/1951 | Foley | G09F 13/10 | 40/577 |
| 3,314,180 | A * | 4/1967 | Porter | B44F 7/00 | D16/222 |
| 3,829,998 | A * | 8/1974 | Flax | B42D 15/042 | D11/135 |
| 4,747,538 | A * | 5/1988 | Dunn | B01F 23/234 | 239/289 |
| 4,944,969 | A * | 7/1990 | Usui | B44F 7/00 | 428/14 |
| 5,157,852 | A * | 10/1992 | Patrou | G09F 1/08 | 40/124.19 |
| 5,378,513 | A * | 1/1995 | Lee | G09F 19/12 | 428/13 |
| 6,871,433 | B2 * | 3/2005 | Anza' | G09F 1/10 | 40/539 |
| 7,594,350 | B2 * | 9/2009 | Yang | A47G 1/0622 | 40/406 |

(Continued)

Primary Examiner — Gary C Hoge
(74) *Attorney, Agent, or Firm* — Fulwider Patton LLP

(57) ABSTRACT

An artistic presentation in the form of a shadow box is disclosed where the shadow box has been augmented with various dynamic visual effects. One such dynamic visual effect is the movement of water across the shadow box, simulating rain droplets, waterfall, sheets of water, or aerosolized water such as fog or mist. When combined with various lighting effects, the combined dynamic visual presentation permits a constantly changing visual appearance that can recycle and go on indefinitely.

10 Claims, 8 Drawing Sheets

(56) References Cited

U.S. PATENT DOCUMENTS

| | | | | |
|---|---|---|---|---|
| 9,427,763 | B2 * | 8/2016 | Fuller | G09F 19/02 |
| 9,711,071 | B2 * | 7/2017 | Chakravartula | G09F 27/00 |
| 2006/0023469 | A1 * | 2/2006 | Chernoff | B05B 17/085 362/565 |
| 2010/0001092 | A1 * | 1/2010 | Kloppenberg | B05B 1/36 239/20 |
| 2010/0187325 | A1 * | 7/2010 | Houstoun | B05B 17/085 239/17 |
| 2011/0078932 | A1 * | 4/2011 | Wilcoxen | G09F 1/12 40/124.191 |
| 2011/0099905 | A1 * | 5/2011 | Rake | E06B 3/6722 239/18 |
| 2011/0252677 | A1 * | 10/2011 | Beebe | G09F 15/0012 40/406 |
| 2017/0011672 | A1 * | 1/2017 | Chakravartula | G09F 13/24 |
| 2018/0214902 | A1 * | 8/2018 | Focaccia | B05B 1/20 |
| 2020/0324309 | A1 * | 10/2020 | Lefebvre | G09F 19/12 |

* cited by examiner

70

THREE DIMENSIONAL SHADOW BOX WITH WATER FLOW

BACKGROUND

This patent application claims priority to U.S. Provisional Patent Application No. 63/055,694 filed Jul. 23, 2020, the content of which is fully incorporated herein by reference.

Art panel displays, sometimes referred to as "shadow boxes," are enclosed or semi-enclosed display cases containing an object or objects presented in a thematic grouping with artistic or personal significance. The grouping of the objects and the depth effect created by their relative heights from the backing creates a dramatic visual result. Three dimensional shadow boxes are artistic creations built at a variety of scales, that generally take the form of several visually overlapping objects aligned with space between them in the depth direction that creates a pleasing visual expression. In many examples, the objects are fabricated such that holes or negative space is used to create silhouettes or illusions. When aligned and viewed from the front, these overlapping layer of objects create a three-dimensional perspective effect, masking and/or exposing various portions of the subsequent layers. The effect may be enhanced with illumination.

Shadow boxes can also be used as an artwork, hung on a wall to take advantage of its visual impact akin to a painting or a photograph. However, shadow boxes are traditionally a static visual effect, where layers are arranged to provide depth and perspective but the visual appearance never changes. Thus, the traditional shadow box loses some of its appeal after it has been viewed multiple times. The present invention adds one or more "dynamic" visual effects to the traditional shadow box, presenting an ever changing appearance that is both captivating and beautiful.

SUMMARY OF THE INVENTION

The present invention is a shadow box that incorporates one or more dynamic effects to a series of static overlapping panels. The use of water droplets, sprays, mists, fogs, streams, pools, and the like can impart a look of precipitation, condensation, waterfall, etc. to produce a feeling of nature to a landscape themed shadow box. Dynamic light in the form of LEDs, lasers, incandescent bulbs, etc. can also be used to simulate lightning, sunrise, sunset, moonlight, or create shadows that simulate movement. To create these effects, water sources, pumps, collection basins, nozzles, and conduits are used to produce the visual props on a continuous basis, causing the shadow box's appearance to be both dynamic and constantly changing. This leads to a far more interesting and visually appealing presentation when compared with the static devices of the prior art.

The present invention is an improvement to the art of shadow boxes where the improvement also lies in the enhancement of the display with the addition of water effects and programmable LED lighting. The various effects may correspond to many different expressions, such as for example simulated rain falling in front of, behind, or between the panels; water wall effects with water flowing down the surface behind the panels, down the panels themselves, or down a piece of glass; fabric, or screen material behind, in front of, or between the panels; fog effects (high-pressure water, nitrogen, ultrasonic, or other fog system); artificial fire effects; fountain jets; or simply water in a basin beneath the panels allowing light and reflection to create moving patterns across the artwork. These various dynamic visual effects significantly enhance the appearance and allure of the shadow boxes and represent a new advance in the art.

These, and many other features of the present invention will best be understood with reference to the detailed description of the invention below, along with the accompanying drawings the description of which is presented below.

DETAILED DESCRIPTION OF THE PREFERRED EMBODIMENTS

The present invention is directed to an art display arrangement with multiple panels with different sized and different shaped openings to transmit light therein through, where a dynamic visual effect is added between or adjacent the panels to alter the image when viewed from a front perspective. It should be understood that multiple different dynamic effects are disclosed herein, and the various effects can be used to create different combinations even though the drawings may only show the effects individually. Therefore, it is understood that multiple effects and systems can be combined to form new works and the invention is intended to include such combinations.

Figure 1:
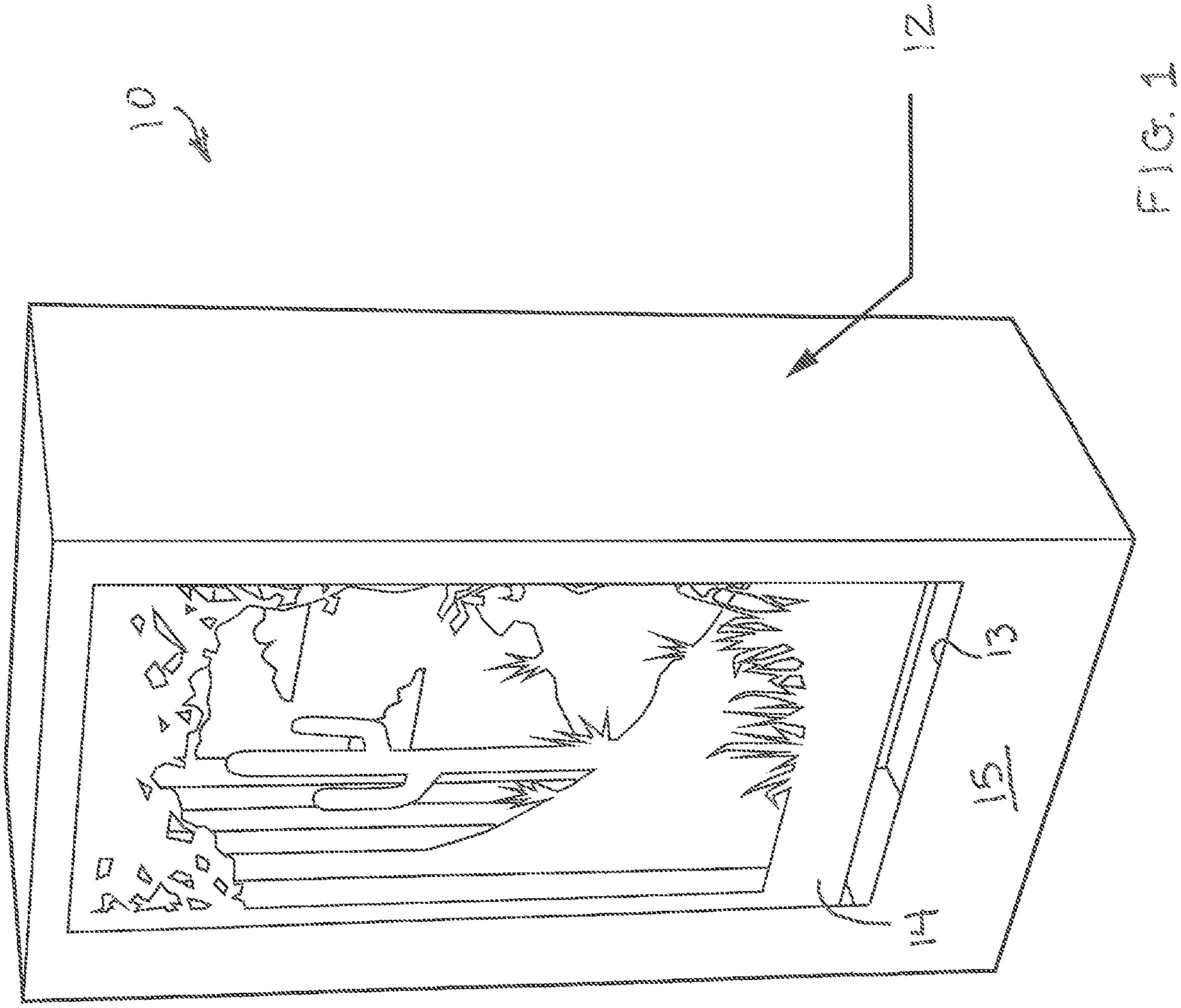
FIG. 1 is an elevated, perspective view of a first embodiment of the present invention.

FIG. 1 depicts a shadow box 10 comprised of a solid enclosure 12 with an opening or window 13 in a front panel 15. The enclosure 12 is hollow and houses a plurality of panels 14 arranged from front to back inside the enclosure. The panels 14 are substantially parallel and secured to the enclosure's interior, such as at the floor or side walls, and have images presented on a forward facing surface. Each panel forms a negative space that allows a viewer to see one or more subsequent panels in the sequence, where the negative space may be created by apertures, removed surfaces, recesses, cut-outs, etc., and each panel may have different shaped apertures revealing features of the subsequent panel. The apertures themselves may form images intended to compliment or coordinate with the images on the surfaces of the subsequent panels to create and accent the appearance of depth in the artwork.

Figure 2:
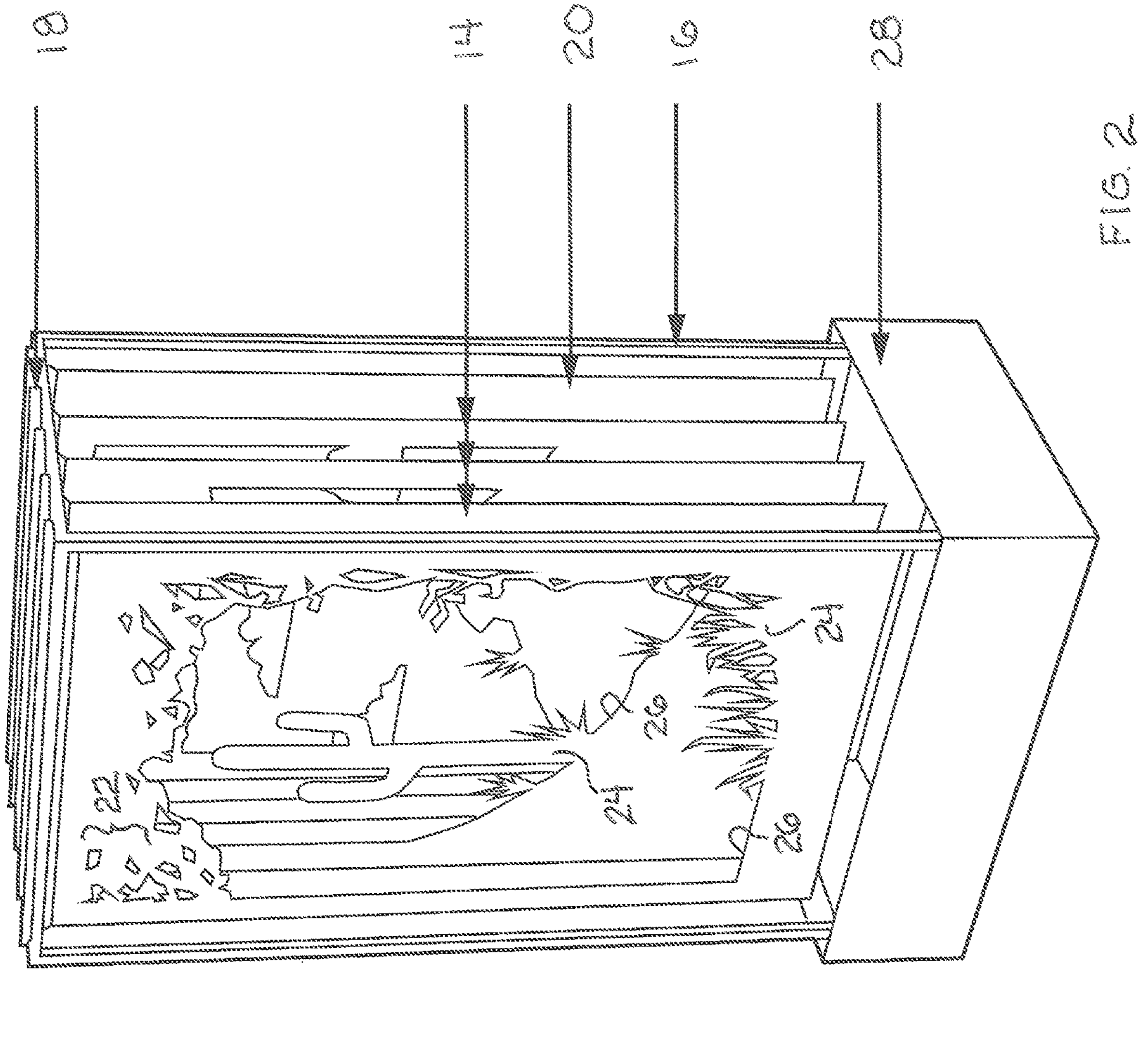
FIG. 2 is an elevated, perspective view of the embodiment of FIG. 1 with the enclosure removed.

FIG. 2 illustrates the shadow box 10 with the enclosure 12 substantially removed to reveal a frame 16 and the arrangement of the panels 14 within the enclosure 12. The frame 16 may be formed with a plurality of panel support brackets 18 that suspend the panels 14 from the frame 16, or the panels 14 can be secured from the side or bottom edges. In some embodiments, the last panel 20 is solid (i.e., no aperture) to provide the background of the visual presentation. Each panel can include artwork 22, silhouettes 24, and one or more apertures 26 that allow a viewer to peer into and through the panels 14, revealing the panels behind it. Below the panels 14 and the frame 16 is a basin 28 where a water collection and pumping system may be disposed for collecting run off water from a water delivery system, as explained in more detail below.

Figure 3:
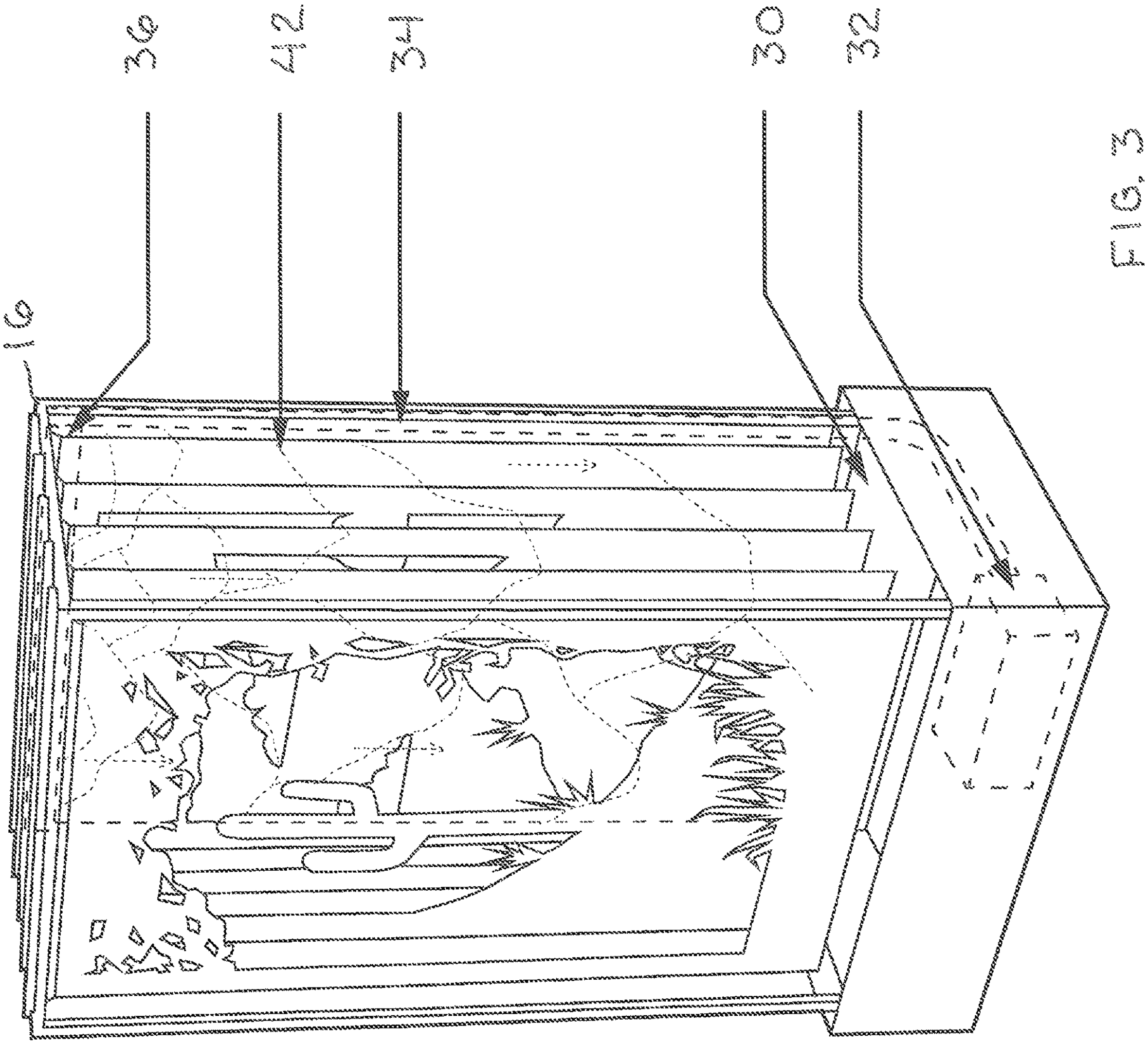
FIG. 3 is an elevated, perspective view of the embodiment of FIG. 1 with a water delivery system.
Figure 4:
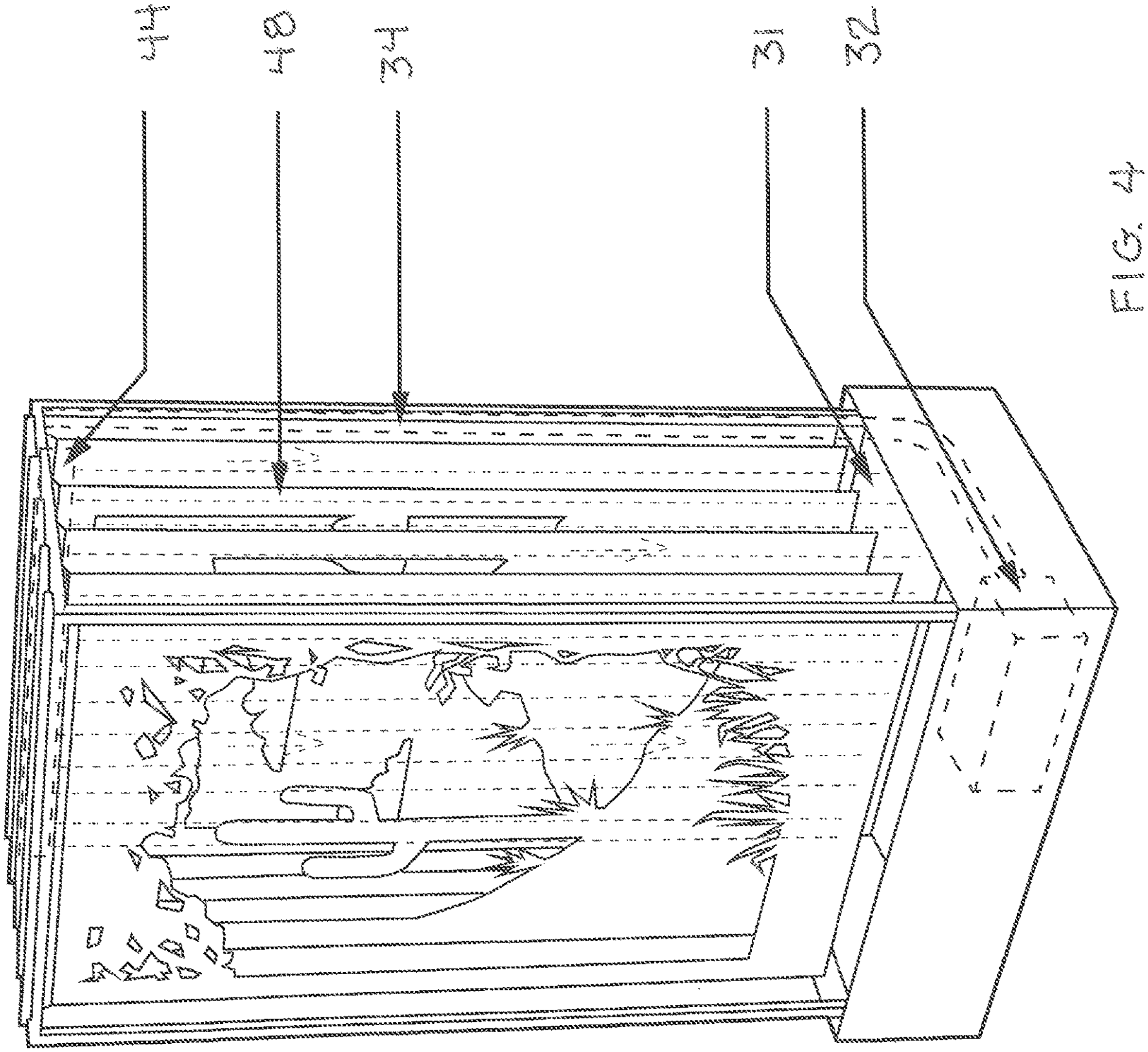
FIG. 4 is an elevated, perspective view of the embodiment of FIG. 3 with an alternate water delivery system.

FIG. 3 illustrates the present invention with a water delivery system incorporated into the shadow box 10. At the basin 28 of the shadow box 10 is a collection tank 30 that is fluidly connected to a pump 32. The pump 32 pushes water collected in the collection tank 30 vertically through a conduit 34 to a water distribution manifold 36 at the upper portion of the frame 16. The water distribution manifold 36 dispense water from the pump 32 along a horizontal upper edge of a selected panel, causing water to move down the panel under the influence of gravity until it reaches the bottom of the selected panel. The water then flows off the selected panel and into the collection tank 30, where it is moved again through the pump 32 in an endless cycle. Alternatively, the water can be released in the gap between the panels, simulating rain or mist. The effect of the water flowing over or between the selected panels creates a dynamic visual effect due to the sheets 42 (or drops or droplets) of falling water. If the selected panel has an aperture 26, the water falls over the aperture creating a different visual effect akin to a waterfall. If the flow rate of the water moving through the water distribution conduit 36 is reduced, the waterfall effect can be transformed into a rain effect. Rain effects 48 can also be generated by selective choice of the nozzles on a rain manifold 44 where the water emanates from the upper edge of the frame, as shown in FIG. 4. The collection tank 30 can also be transformed into a reflecting pool 31 for maintaining a generally calm, constant water level that reflects the images above for yet another visual effect. The reflecting pool can be combined with the rain or waterfall effect, or be a stand-alone effect using the pump 32 to circulate the water in the reflecting pool 31.

Figure 5:
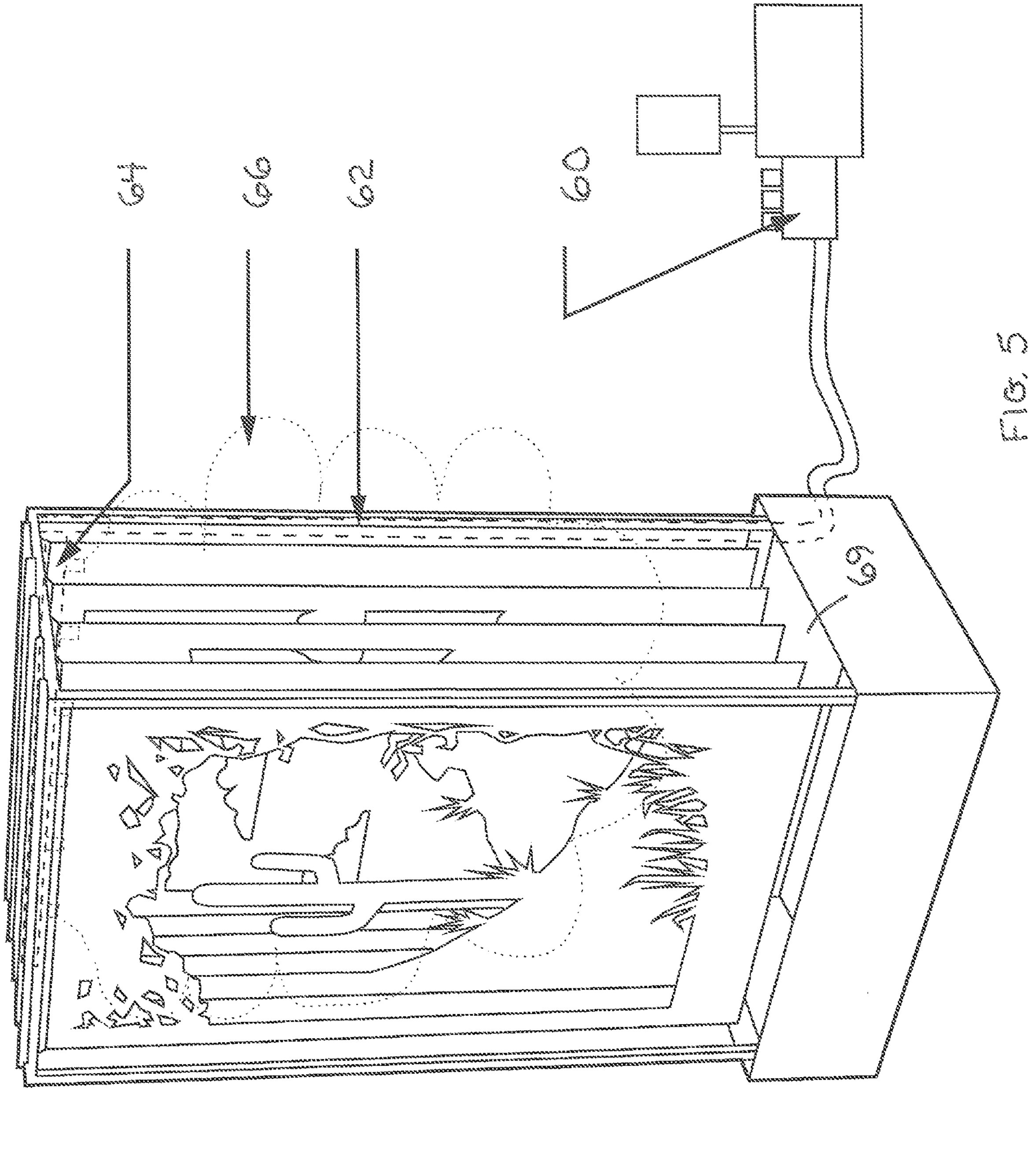
FIG. 5 is an elevated, perspective view of the embodiment of FIG. 1 with a fog delivery system.

FIG. 5 illustrates another dynamic effect, where aerosolized water droplets are formed and dispersed between panels to create a mist or fog effect. The use of a fog system is similar to the water system of FIG. 4, but special aerosolizing nozzles are used to create a mist or fog falling from the upper frame 16. A specialized fog generator 60 can also be used, where fog 66 is formed in the fog generator and carried up tubing 62 to a fog manifold 64 and released through fog nozzles that allow the fog 66 to waft down the shadow box between the panels 14 to create a unique dynamic visual presentation. A collection bin 69 may be used to collect condensation and mist, and this water may be recycled and returned to the fog machine 60. Alternately, the fog machine 60 can be connected to a separate water source that is used to continuously create the mist/fog flowing between the panels 14.

Figure 6:
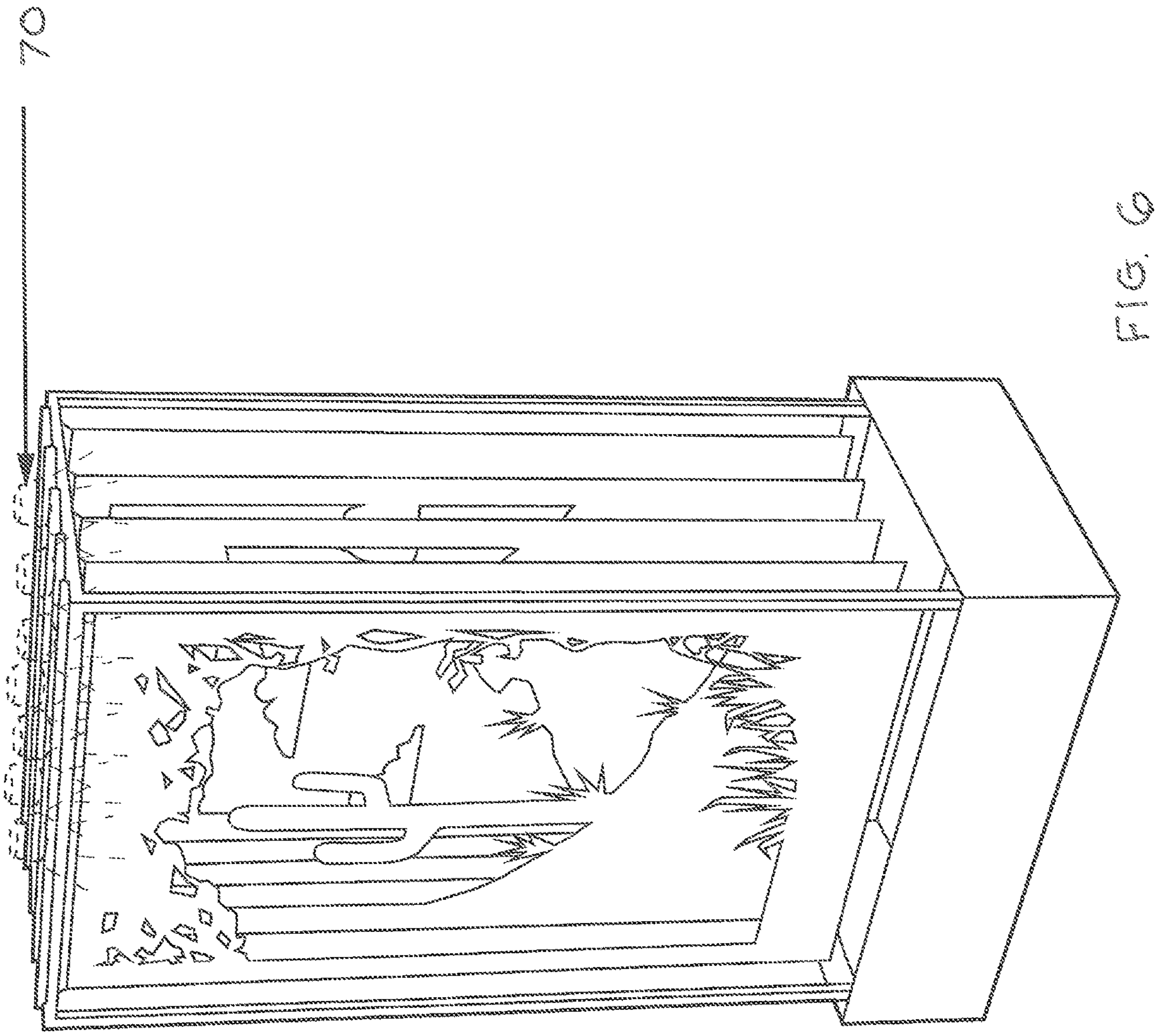
FIG. 6 is an elevated, perspective view of the embodiment of FIG. 1 with an illumination system.
Figure 7:
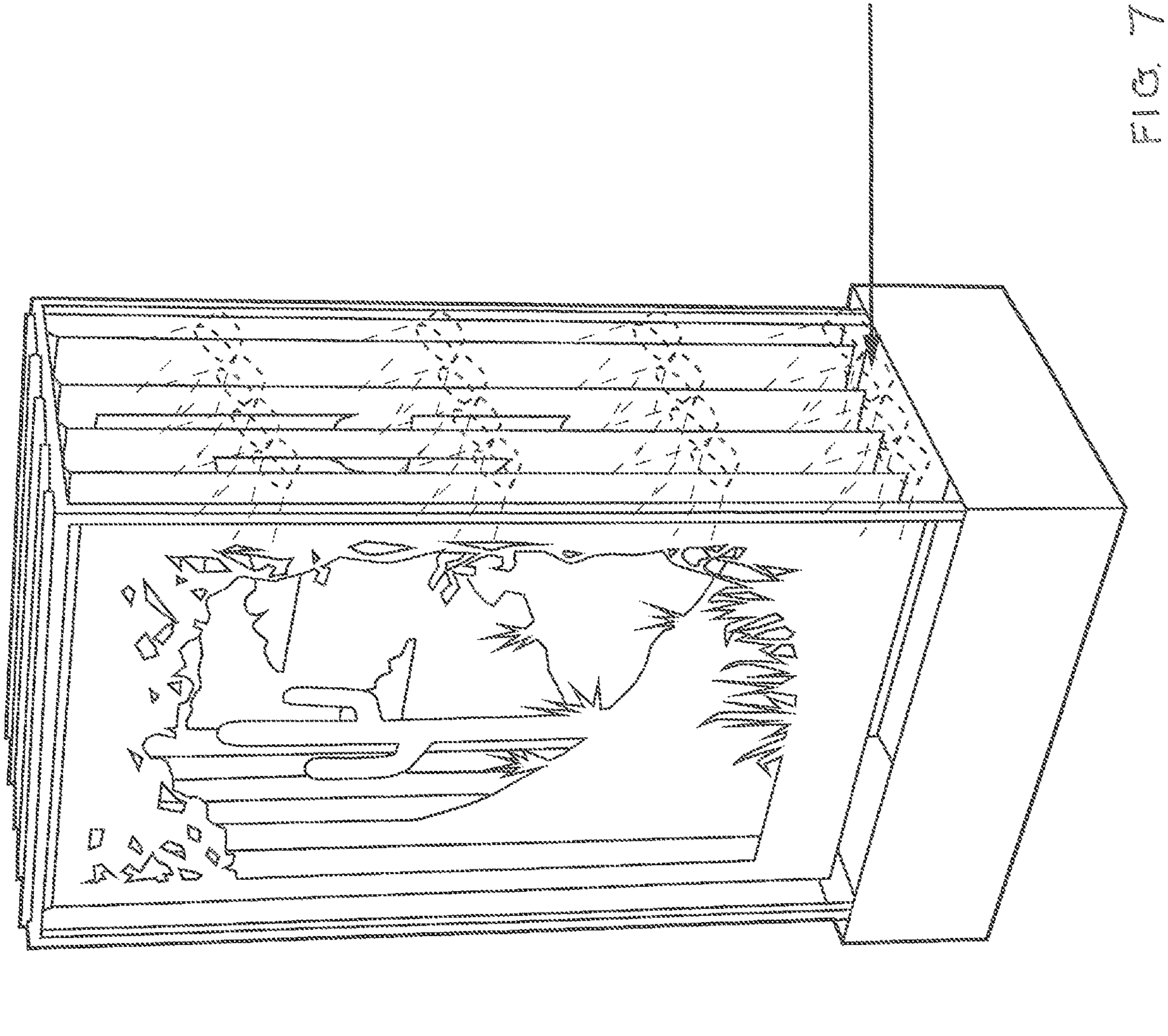
FIG. 7 is an elevated, perspective view of the embodiment of FIG. 6 with an alternate illumination system.
Figure 8:
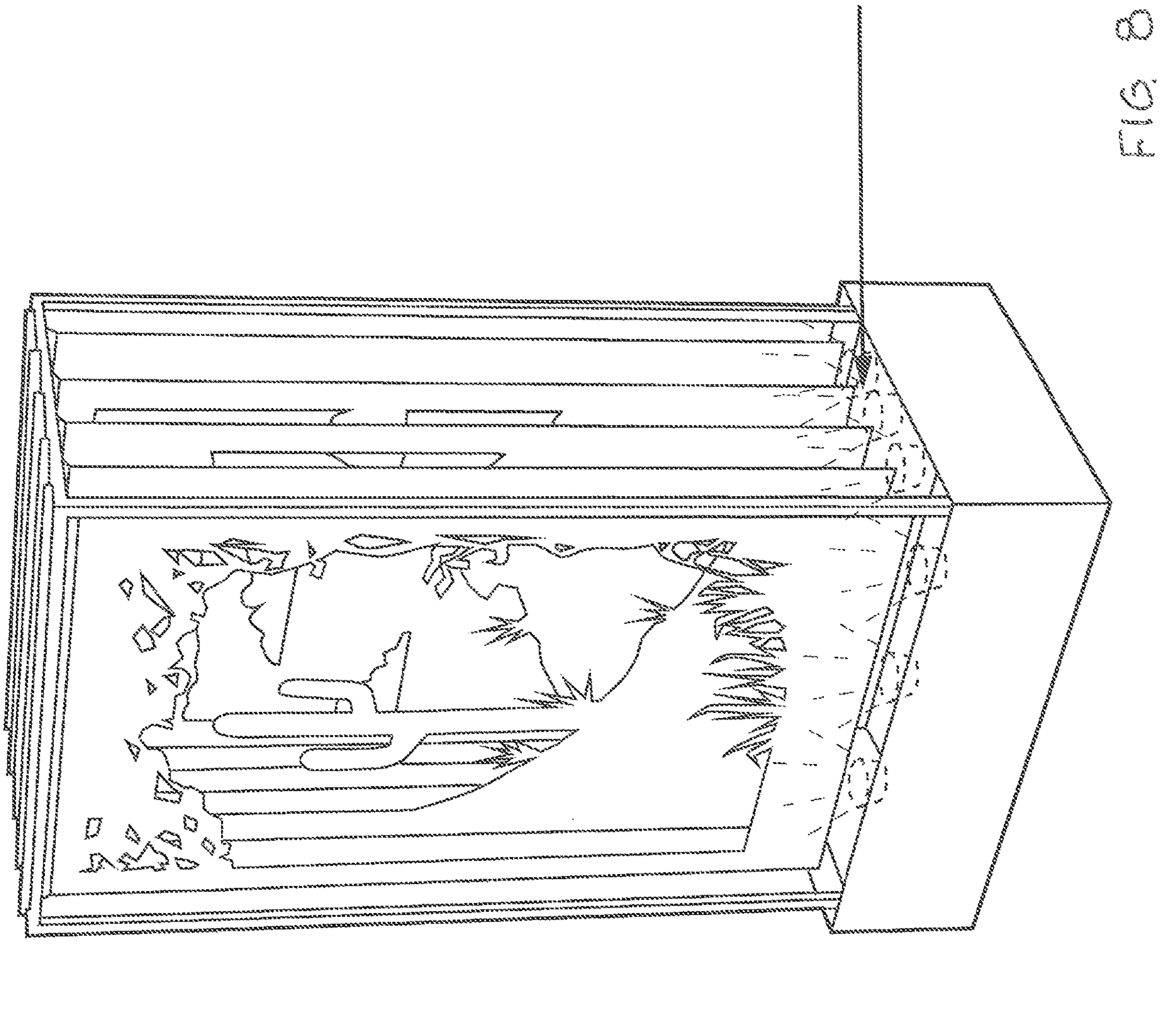
FIG. 8 is an elevated, perspective view of the embodiment of FIG. 6 with another alternate illumination system.

FIGS. 6-8 illustrate the use of illumination at the top, intermediate, and below the panels 14 to create a different visual appearance. The illumination elements 70 can be candescent, LED, lasers, or other light source, and can be colored to create different visual appearances. The colors can blink, strobe, fade, change colors, intensify, move, and utilize other mechanisms to create a different visual pattern and appearance. When combined with the flow of water/rain/fog/mist, the overall impression is a dynamic visual presentation that is constantly changes and captivating.

While the majority of these systems (excluding fog) are recirculating systems that pump and recycle water in a continuous circuit, it is also possible that these effects could be created with a pass-through system where water is used to create a visible display as it passes through the system before being conveyed elsewhere.

As this assembly is closely integrated with water, it preferably is fabricated from suitable materials that are not be negatively affected by exposure to high levels of humidity, occasional splashing, repeated wetting, or continual immersion. Such materials include, but are not limited to plastics, metals (stainless steel, aluminum, brass, bronze), stone, glass, and ceramics to name a few.

While specific embodiments of the invention have been described and depicted, all embodiments of the present invention have not been shown for brevity. Various combinations of those characteristics shown and described herein are properly deemed to be part of the present invention, and nothing in this disclosure should be considered limiting unless expressly stated.

We claim:

1. A shadowbox having an enclosure and a plurality of panels mounted therein, the panels configured to permit observation of each subsequent adjacent panel, comprising:
- a frame for mounting the panels;
- a water collection basin below the panels;
- a pumping system for pumping water from the water collection basin to an upper portion of the enclosure; and
- a water delivery system configured to dispense water from an upper portion of the enclosure to the water collection basin, the water delivery system including a water distribution manifold that directs water between two or more of the panels;
- wherein the water delivery system includes one or more nozzles to create an aerosol mist from the water.

2. The shadowbox of claim 1 wherein the water delivery system includes a water distribution manifold that directs water onto one or more of the panels.

3. The shadowbox of claim 1, wherein the water delivery system forms droplets that fall between the two or more panels.

4. The shadowbox of claim 1, wherein the water delivery system forms sheets of water that fall between the two or more panels.

5. The shadowbox of claim 1, wherein the water collection basin serves as a reflecting pool and includes a light source.

6. The shadowbox of claim 1, further comprising a fog generator that converts water to fog and dispenses the fog through a fog manifold within the enclosure.

7. The shadowbox of claim 1, further comprising illumination means disposed in the enclosure.

8. The shadowbox of claim 7, wherein the illumination means are a plurality of LED lights that change colors.

9. The shadowbox of claim 7, wherein the illumination means are a plurality of LED lights that blink.

10. The shadowbox of claim 7, wherein the illumination means are a plurality of LED lights that vary in intensity.

* * * * *